United States Patent [19]

McDowell

[11] 4,351,534
[45] Sep. 28, 1982

[54] ABRASIVE-EROSION RESISTANT GASKET ASSEMBLY

[75] Inventor: Donald J. McDowell, Riverside, Ill.

[73] Assignee: Felt Products Mfg. Co., Skokie, Ill.

[21] Appl. No.: 149,036

[22] Filed: May 12, 1980

[51] Int. Cl.³ .............................................. F16J 15/06
[52] U.S. Cl. ................................................. 277/235 B
[58] Field of Search ................... 277/166, 235 B, 234, 277/229

[56] References Cited

U.S. PATENT DOCUMENTS 3,448,986 6/1969 Jelinek et al. ................... 277/235 B
3,473,813 10/1969 Meyers et al. .................. 277/235 B
4,272,085 6/1981 Fujikawa et al. ............... 277/235 B Primary Examiner—Robert I. Smith Attorney, Agent, or Firm—Dressler, Goldsmith, Shore, Sutker & Milnamow, Ltd.

[57] ABSTRACT

An abrasive-erosion resistant head gasket assembly includes a flat-elongated core, a sheet of composite gasket material on each face of the base, armor to seal the combustion chambers, and bodies of abrasive-erosion resistant elastomeric material at each end of the gasket assembly. The abrasive-erosion resistant bodies are selectively applied to the end zones of the gasket assembly where abrasive-erosion is normally at a maximum. The bodies resist abrasive-erosion. The bodies are applied to the facing material or in zones from which the facing materials have been removed and preferably are cured concurrently with the lamination and curing of the facing materials.

10 Claims, 3 Drawing Figures

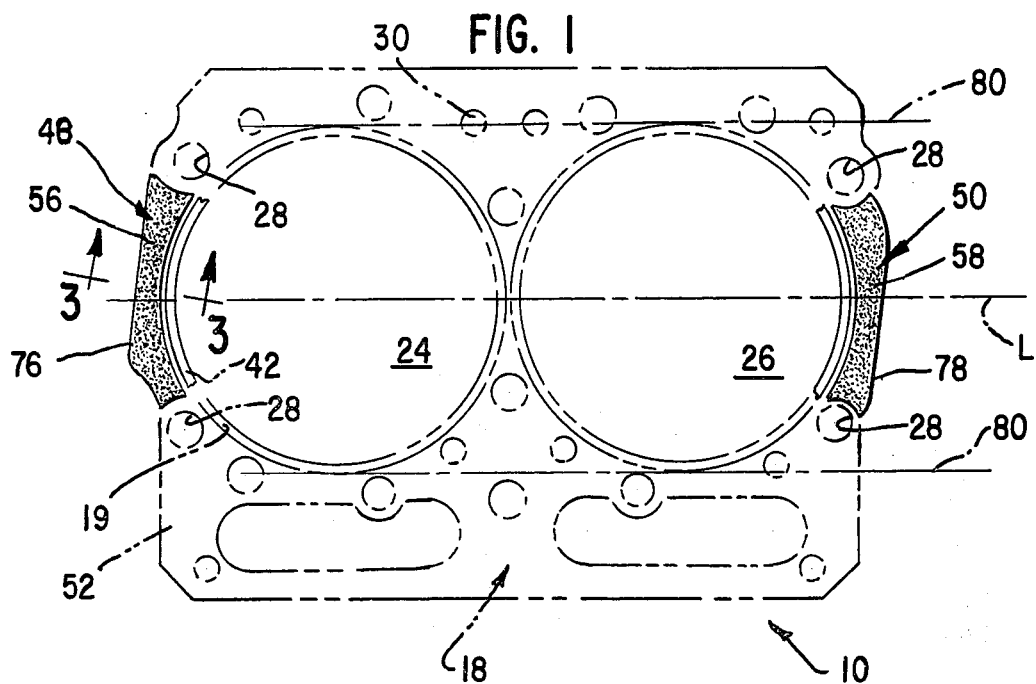
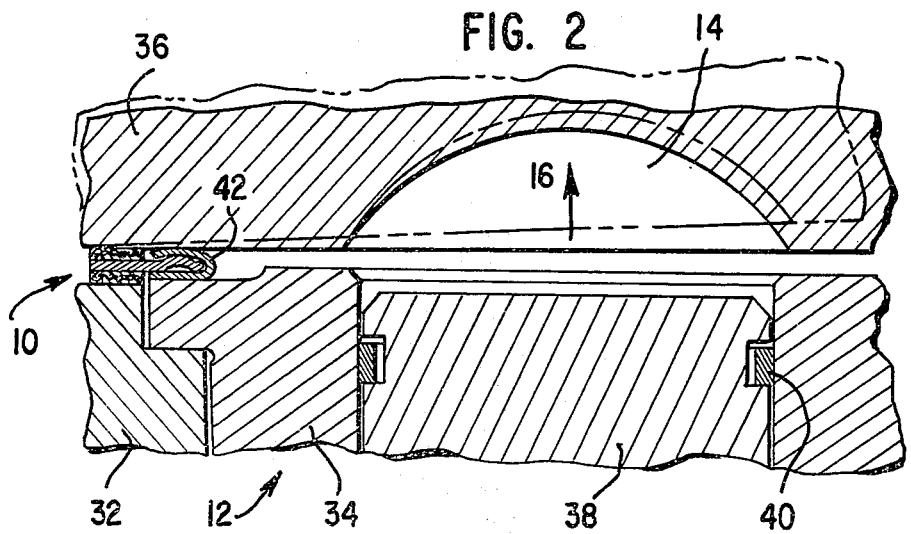
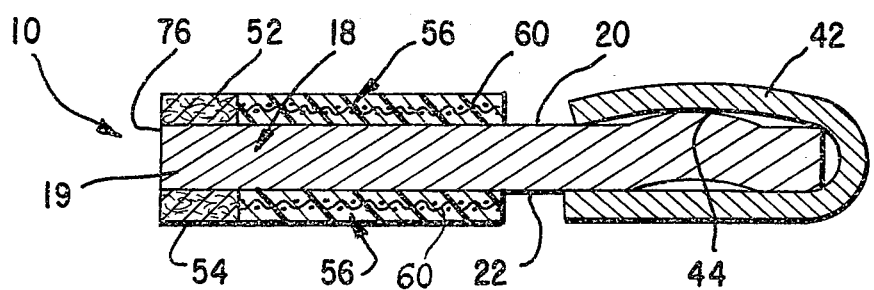

ABRASIVE-EROSION RESISTANT GASKET ASSEMBLY

TECHNICAL FIELD

This invention pertains to gaskets and gasket assemblies used to seal components of an internal combustion engine. In particular, this invention relates to a gasket assembly and to a method for producing a gasket assembly which resists the effects of abrasive-erosion on the sealing gasket installed between the engine block and the cylinder head.

BACKGROUND OF THE INVENTION

In spite of the fact that the top surface of an engine cylinder block and the lower surface of an engine cylinder head may be smooth to the eye, the two surfaces never fit together closely enough to prevent leakage. Therefore, a gasket must be inserted between them to effect a seal. Various head gasket designs have been used, and these include metal head gaskets, fibrous head gaskets, sandwich type head gaskets using a metallic core and asbestos-bonded layers laminated to the core, etc. Sandwich-type gasket assemblies have sufficient resiliency to seal the cylinder head and sufficient heat resistance, especially when armored, to withstand the high temperature and pressure of the combustion chamber.

The current energy crisis has led to the development of an array of lightweight, high output, gasoline and diesel engines, both aspirated and turbocharged. One result of this shift to lighterweight engines is the increased potential for abrasive-erosion of gaskets. The phenomena of abrasive-erosion occurs in a gasket when it is placed between and in contact with the engine block and cylinder head and is then subjected to a substantial compressive load or stress and the cyclic, high frequency impulse forces and vibrations generated by the engine. These forces and vibrations tend to impart very slight relative movement between the confronting metal surfaces and the gasket. Typically, the gasket must withstand combustion pressures of 7,000 kilopascals (kPa)* in a naturally aspirated spark-ignition engine and 19,000 kilopascals or higher in a turbocharged diesel engine. Because of these high stresses, lighterweight castings and lighterweight, less rigid materials when used to form cylinder heads and engine blocks result in greater relative motion between the two bolted together components and the sealing gasket. The result of the vibratory movement is that wear and erosion of the confronting surfaces occurs and, when the gasket employs fibrous facings, the facing material begins to erode, especially at the longitudinal ends of the gasket.
*1 pascal = 1 newton/meter$^2$ = 1.450377 × 10$^{-4}$ psi An important physical property of any gasket is good torque retention. In general, torque retention is associated with the amount of compressible material in a gasket. Compression set is defined as the residual deformation of a material after the removal of the force tending to compress it together. Specifically, if the amount of compressible material is reduced, torque retention improves. It is for this reason that thicker materials are not normally used in sealing applications requiring high torque retention. With thinner materials, however, there must be sufficient compressibility consistent with a good seal. Thus, a problem is present in maintaining good torque retention while at the same time resisting the effects of abrasive-erosion. The gasket thickness cannot simply be increased to account for wear and loss of sealing due to erosion of sealing material. Neither can an increase in the clamping forces that are used be employed to eliminate the relative movement. That simply is not practical because most applications are already at the highest possible clamping load condition.

SUMMARY OF THE INVENTION

In accordance with the present invention, there is provided a method for making a gasket assembly, and a gasket assembly adapted to be positioned between an engine block and head of an internal combustion engine. The gasket assembly includes a metal gasket body having first and second generally planar surfaces defining at least one piston-size aperture, fluid-flow passageways and armor around the combustion openings. A sheet of sealing material is applied to each of the two planar surfaces to form a composite, laminated gasket assembly.

In the case of an engine having a plurality of combustion chambers arranged in a line, selected portions of the sealing material at each end of the gasket assembly are omitted and an implant or insert of an elastomeric material, such as a heat resistant, fabric reinforced silicone rubber, is provided instead. The elastomeric material may also be added directly to the surfaces of the sealing material.

The elastomeric material, because of its capacity to move in shear, will take up the vibratory, relative motion between the head and the block, and therefore will not abrade or erode as will compressible non-elastomeric facing materials. The application of abrasive-erosion resistant elastomeric materials at those critical areas of the gasket assembly where abrasive-erosion is most likely to occur thus tends to eliminate abrasive-erosion as a potential source of failure of the gasket assembly. Also, the gasket assembly is kept as thin as possible consistent with the applied forces so as to preserve and enhance the torque retention properties of the gasket assembly. Thus, the gasket assembly is able to withstand a substantial compressive load or stress along with high frequency impulse forces and vibrations over a long period of time without an adverse effect on the torque retention properties of the gasket assembly.

Other advantages and features of the present invention will become readily apparent from the following detailed description of the invention and an embodiment thereof, from the claims and from the accompanying drawings.

BRIEF DESCRIPTION OF THE DRAWINGS

FIG. 1 is a top plan view of an abrasive-erosion diesel engine gasket assembly incorporating the principles of the present invention;

FIG. 2 is a partial cross-sectional elevational view of a diesel engine incorporating the gasket assembly shown in FIG. 1 and illustrating the relative motion between the engine block and cylinder head leading to abrasive-erosion; and FIG. 3 is an enlarged cross-sectional view of a fragmentary portion of the abrasive-erosion resistant diesel engine gasket assembly taken along line 3—3 of FIG. 1.

DETAILED DESCRIPTION OF THE ILLUSTRATIVE EMBODIMENT

Referring to the drawings, an abrasive-erosion resistant diesel engine gasket assembly 10 is especially configured and constructed to be used in an internal combustion engine 12 having a plurality of combustion chambers 14 (only one being shown in FIG. 2) arranged along a line L defining the longitudinal axis of the engine. Although it is clear that an engine having only one combustion opening can be used with gasket assemblies made in accordance with this invention, the invention will be illustrated by a multicombustion opening gasket assembly and engine. Specifically, the abrasive-erosion resistant gasket assembly 10 includes a main body portion 18 having an elongated generally flat, metal core or base 19 (see FIG. 3). The base 19 has a top or first generally planar surface 20 and bottom or second generally planar surface 22. The top and bottom surfaces 20, 22 are generally parallel to each other.

On each side of the base 19, a sheet of composite compressible gasket facing material different from the material of the base 19 is applied. These facing sheets 52, 54 are typically fiber reinforced and are attached mechanically or adhesively to the two surfaces 20, 22 of the metal gasket base 19. The most popular and frequently used facings incorporate asbestos or glass fibers and utilize nitrile, neoprene or polyacrylic elastomers to provide the self-sustaining facings. In the embodiment illustrated, the facings may be about 0.025 inch thick, although this may vary with the application. Facing sheets 52, 54 generally resist degradation by oils and coolants, retain torque, minimize extrusion and exhibit heat resistance.

The main gasket body 18 is die cut or blanked out such as with a stamping machine, punch press or other suitable equipment to provide, in the illustrated embodiment, a pair of piston-size apertures or combustion openings 24, 26, bolt holes 28, a plurality of fluid flow passageways, such as oil and water passageways 30. A typical main gasket body 18 having the configuration as shown in FIG. 1 has a total thickness of about 0.080 inch. Other shapes and thicknesses may be used depending upon the configurations and requirements of the engines with which the gasket assembly is to be used. Typical constructions are identified in U.S. Pat. No. 3,565,449 assigned to the assignee of the present invention.

FIG. 2 illustrates one application of the gasket assembly shown in FIG. 1. Specifically, the engine 12 includes an engine block 32 having a liner 34 and a cylinder head 36. The cylinder head 36 and the liner 34 define at least two combustion chambers 14 (only one of which is shown). Each combustion chamber 14 contains a piston 38 joined to the crankshaft (not shown). The combustion chamber 14 is sealed by one or more piston rings 40 carried by the piston 38. The gasket assembly 10 is juxtaposed between the engine block 32 and cylinder head 36.

Gasket assembly 10 further comprises armor 42 in the combustion openings 24, 26 to protect the main body portion 18 of the gasket from the combustion chambers 14 and to seal-off the combustion chambers. The thickness and shape of the armor 42 is a function of a number of factors known to those skilled in the art. For example, high output engines including turbocharged engines normally require stainless steel armor for improved high temperature and fatigue resistance. In diesel applications, an armored gasket incorporating a wire ring is often used to provide sealing at the increased combustion pressures experienced in operating those engines. In the embodiment illustrated, the base 19 is embossed adjacent the combustion openings 24, 26 to form an embossment 44 which is embraced and ensheathed by the U-shaped armor 42. By varying the height and/or width of the embossment 44 a wide range of load compression properties can be maintained.

In accordance with this invention abrasive-erosion of the gasket assembly 10 and the associated engine 12 is minimized. Abrasive-erosion appears to be the result of the microscopic repeated displacement of the cylinder head 36 relative to the engine block 32 and gasket assembly 10. The pressure produced by combustion within the combustion chambers 14 results in a pressure-force being applied to the interior surfaces of the combustion chamber. Usually, because the cylinder head 36 is less massive than the engine block 32, the relative motion between the cylinder head 36 and the engine block 32 can be visualized as the result of the cylinder head 36 moving relative to a fixed or rigid engine block 32. Sometimes, however, the block may flex as well especially where lightweight, hollowed-out blocks are used.

Relative motion can be due to a variety of factors. These factors include the relative rigidity of the engine head and block at differing locations, the strength, placement and spacing of the bolts used to hold the engine block and head together and the relative dimensions of the head and block. Some of these factors also depend upon the number and place of the cooling water passageways and the location and number of intake and exhaust ports. Accordingly it is difficult to predict where in a given engine the relative movement which induces abrasive-erosion will occur. However, it is usually at two spaced apart opposite ends of a gasket assembly. Consequently, for each gasket assembly and engine it is necessary to determine where abrasive erosion occurs and then to locate the abrasive-erosion resistant material at those points.

Usually, in an elongated multicombustion opening gasket, abrasive erosion will occur at the longitudinal ends of the gasket assembly. Movement inducing abrasive-erosion is schematically depicted in FIG. 2, where for purposes of illustration it is assumed that the engine head 36 moves from its full line position to the phantom position with respect to a stationary, rigid block 32 due to compression forces. These forces may produce a generally upward force and a displacement along the axis (arrow 16) of the combustion chamber 14. As a consequence, the relative amount of motion or displacement is at a maximum at each end of the engine 12, hence at each end of gasket assembly 10. In particular, it has been determined that where gaskets encounter wear and erosion at each of two opposite ends of a gasket, such as gasket assembly 10, that wear is usually in the zones 48 and 50 at the very ends of the assembly within the areas bounded by lines 80 tangential to the peripheries of the several combustion openings 24, 26, the sides of the combustion openings facing the ends 76, 78 of the gasket assembly, and the ends of the gasket assembly. It is in zones 48, 50 that the facing sheets 52, 54 gradually tend to fail due to abrasive-erosion. This, in turn, leads to the escape of combustion gases and to an eventual failure of the engine 12.

In accordance with this invention, zones 48, 50 are provided with an abrasive-erosion resistant material, and to that end, elastomeric bodies 56, 58 are provided in zones 48, 50. In a preferred embodiment, after the application of facing sheets 52, 54 to the surfaces 20, 22 of the base 19, selected portions of the facing sheets 52, 54 are removed (i.e., in zones 48, 50) and inserts or bodies 56, 58 of an elastomeric material are substituted. A preferred insert is a high temperature-resistant, fabric reinforced silicone rubber material, preferably with a fabric reinforcing sheet 60. Alternatively, open areas or apertures may be provided in the facing sheets 52, 54 prior to their application to base 19, exposing the areas in which the inserts are to be inset. This technique avoids the need to remove portions of the sheets 52, 54 after they have been applied to the base 19.

Alternatively, in some environments elastomeric bodies may be directly applied to the surfaces of the facing sheets. If this option is selected the bodies will be relatively thinner. However, fabrication is somewhat simplified in that openings do not have to be formed in the facing sheets 52, 54.

In addition, the facing sheets 52, 54 can be embossed during the formation of the combustion openings 24, 26, bolt holes 28, fluid passageways 30 and exhaust ports 31. As shown in the drawings the bodies 56, 58 are applied to both the top 20 and botom 22 surfaces of the base 19.

The actual extent to which the bodies 56, 58 are applied at each longitudinal end 76, 78 of the gasket assembly 10 is largely dependent upon achieving an adequate seal and at the same time reducing the tendency for abrasive-erosion. In general, and as shown in FIG. 1, these bodies 56, 58 are applied in the zones 48, 50 indicated so as to include the space provided for the bolt holes 28 at the ends of the engine 12. Typically, the bodies 56, 58 are from one-eighth to one-half inch in width except where the available space does not permit this application width.

The facing sheets 52, 54 and bodies 56, 58 may be applied in an uncured or cured state. Conventionally, the facing sheets 52, 54 are applied to base 19 in an uncured state and are laminated under heat and pressure. The inserts 56, 58 may be applied at the same time, and then may be cured at the same time as the facing sheets, as at 350° F. for approximately one minute.

The abrasive-erosion bodies 56, 58 in contact with the engine block 32 and cylinder head 36 should substantially eliminate the degradation of the facing sheets 52, 54 and reduce engine failures which have occurred in the past due to abrasive-erosion of the facing sheets. These results should be obtained without otherwise adversely affecting the performance of the gasket assembly 10. The abrasive-erosion resistant characteristics of the gasket assembly of his invention are believed to be largely attributable to the ability of the elastomeric bodies to deflect in shear in response to relative movements of the head and block, thereby to accommodate that movement, rather than abrade and erode in response to the movement.

Although one embodiment of the invention has been illustrated and discussed in detail, it is to be understood that the various modifications and substitutions may be made by those skilled in the art without departing from the novel spirit and scope of the invention.

What is claimed is as follows:

1. An abrasive-erosion resistant gasket assembly adapted to be positioned between an engine block and head, said engine defining at least one combustion chamber, said gasket comprising a main body portion including gasket base providing a first surface and a second surface and a composite facing material on each said surfaces, said gasket assembly defining at least one combustion opening, said gasket assembly further comprising a heat-resistant elastomeric body at each of two opposite ends of said gasket base, said elastomeric body being of a material different from the facing material and being deflectable in shear to deflect in response to relative movements of an engine block and head, thereby to resist abrasive erosion of said gasket assembly.

2. The abrasive-erosion resistant gasket assembly of claim 1, wherein said elastomeric bodies comprise silicone rubber bodies.

3. The abrasive-erosion resistant gasket assembly of claim 2, wherein said silicone rubber bodies embed a temperature resistant reinforcing fabric sheet.

4. The abrasive-erosion resistant gasket assembly as defined in claim 2, further comprising armor adjacent the periphery of said combustion opening thereby to seal off the main body portion from the combustion gases when the gasket assembly is in use.

5. The abrasive-erosion resistant gasket assembly of claim 1, wherein said bodies are disposed on surfaces of said gasket base adjacent said facing material.

6. The abrasive-erosion resistant gasket assembly of claim 1, wherein said engine defines a plurality of combustion chambers and said chambers are disposed along a longitudinal axis of said engine, said gasket assembly being elongate and defining a plurality of combustion openings arranged in a line, said bodies being located at opposite longitudinal ends of said gasket assembly.

7. The abrasive-erosion resistant gasket assembly of claim 6, wherein said bodies are in end zones of said gasket assembly within the areas bounded by lines tangential to the peripheries of the plural combustion openings, the sides of the combustion openings facing the ends of the gasket assembly and the gasket assembly ends.

8. The abrasive-erosion resistant gasket assembly of claim 7, wherein said elastomeric bodies comprise silicone rubber bodies embedding a high-temperature resistant, reinforcing fabric sheet.

9. The abraisve-erosion resistant gasket assembly as defined in claim 7, further comprising armor adjacent the peripheries of said combustion openings thereby to seal off the main body portion from the combustion gases when the gasket assembly is in use.

10. The abrasive-erosion resistant gasket assembly as defined in claim 5, wherein said elatomeric bodies are silicone rubber bodies each embedding a high-temperature resistant reinforcing fabric sheet.

* * * * *